3,830,738
SURFACE TREATMENT OF PARTICULATE SOLIDS
Arnold George Cottrell, Runcorn, England, assignor to Imperial Chemical Industries Limited, London England
No Drawing. Original application Jan. 25, 1971, Ser. No. 109,568, now abandoned. Divided and this application June 15, 1972, Ser. No. 263,213
Claims priority, application Great Britain, Feb. 16, 1970, 7,385/70
Int. Cl. A62d 1/12
U. S. Cl. 252—4         4 Claims

ABSTRACT OF THE DISCLOSURE

There is provided a fire fighting foam compatible fire fighting powder composition composed of an alkaline fire-extinguishing powder and from 1% to 5% of a partially hydrophobic powdered silica having a surface area of at least 10 square meters per gram and carrying a surface treatment with a silane; the silane has a hydrophobic group which is non-reactive to the silanol groups on the silica surface and a further group on the silane is reactive to the silanol groups on the silica surface. Suitably, the hydrophobic group can be alkyl and the reactive group can be chlorine. The degree of hydrophobicity measured by the methanol titration test is in the range of 5 to 35.

---

This invention relates to the surface treatment of particles and in particular to the surface treatment of silica particles.

It is known that the surface properties of solids may be modified by applying a silane or siloxane which often polymerises to form a polysiloxane or silicone layer on the surface. By such a treatment a normally hydrophilic surface is rendered hydrophobic. When this treatment is applied to the individual particles of powders the flow properties of the powders themselves, or of other solid powders to which the treated particles are added, are improved. However other properties may be seriously impaired, for example properties which depend upon the presence of hydrophilic groups on the surface or attraction to the surface of other hydrophilic groups. As an illustration we observe that most known silane and siloxane treatments of silica render the surface so hydrophobic that the silica causes collapse of most aqueous foams. Thus we have found that for many purposes, of which foam compatibility is one example, a particulate silica possessing properties intermediate between those of untreated and hydrophobic silica is necessary.

Thus according to the present invention there is provided a surface-treated powdered silica having a surface area of at least 10 square metres per gram and possessing a degree of hydrophobicity measured by the methanol titration test hereinafter described in the range from 5 to 35.

According to another aspect of the invention there is provided a powdered silica having a surface area of at least 10 square metres per gram treated with an organosilicon compound to produce a degree of hydrophobicity of the surface having a value from 5 to 35 as measured by the methanol titration test hereinafter described.

The methanol titration test is an empirical test which distinguishes and identifies powdered silicas possessing a degree of hydrophobicity intermediate between the untreated silica having a hydrophilic surface and the treated silica whose surface has been rendered completely hydrophobic.

The said test is performed as follows:

The "Methanol titration test" herein specified for the assessment of the degree of hydrophobicity of a treated silicon is conducted as follows. 0.2 gm. of the powder under test is added to 50 ml. of water in a 250 ml. conical flask. Methanol is titrated from a burette until all the silica is wetted which end-point is observed by the suspension of all the powder in the liquid. Prior to the end-point being reached some particles or agglomerates are observed to float on the surface of the liquid. The degree of hydrophobicity is quoted as the percentage of methanol in the liquid mixture of methanol and water when the end-point is reached.

It is known that silanol groups are present on the surface of untreated silica and we believe that the replacement of silanol groups by groups terminating in a hydrocarbon radical for example an alkyl or phenyl radical changes the character of the surface from hydrophilic to hydrophobic. However it is not necessary to replace all the silanol groups in order to effectively remove all hydrophilic character. It is possible for the groups imparting hydrophibic character to so cover the surface, and perhaps overlay the silanol groups, that the hydrophilic character of the surface is lost and the silica is said to be "completely" hydrophobic. We define the meaning of that term as being those finely divided silicas giving a value of greater than 40 on the methanol titration test hereinbefore described.

The silicas of intermediate hydrophobic character which we select as exhibiting a useful balance of properties give value of 5 to 35 on the methanol test. We prefer to use silica powders giving a value in the same test of 15 to 35: these latter are observed to be preferable in a variety of applications hereinafter described. For the optimum balance between good flow properties and good compatibility with foams, especially firefighting foams, a silica giving values of 20 to 30 on the same test is especially preferred.

Hydrophilic finely divided silica, sometimes referred to as "high-area" or "colloidal" silica, may be produced by a variety of methods, for example by pyrogenic methods, or by the precipitation and drying of dispersed silica sols. The surface area may be for example from 10 to 70 square metres per gram but is generally within the range 100 to 400 square metres per gram, the particular surface area chosen (or conversely the size of particle chosen) depending upon the applications in mind. Any of the hydrophilic silicas described above are suitable as starting materials from which the product of this invention may be made. However, we prefer to use an "Aerosil" type of silica of low bulk density.

The degree of hydrophobicity required in the product of this invention may be imparted to the silica by a variety of methods, for example chemical treatment of the surface with a silane, a siloxane, or mixtures of silanes and siloxanes.

These methods of chemical treatment may be tailored to produce the desired degree of hydrophobicity in at least three ways:

(1) Methyl groups are small and exert a high degree of hydrophobicity but less hydrophobic hydrocarbon groups may be chemically-bound to the surface, for example ethyl, phenyl and alkoxy methyl.

(2) The surface coverage of hydrophobic groups may be restricted either (a) by using a small concentration of reagent insufficient to react with all the silanol groups on the surface, or (b) by using a bulky hydrophobic group so that steric factors prevent the packing of sufficient groups. The first (a) is difficult to control reproducibly and the second is a semi-theoretical concept which is believed to operate when certain groups, e.g. trimethyl silyl or tertiary butyl silyl groups are added.

(3) The hydrophobic groups may be deliberately interspaced across the silica surface with hydrophilic groups, for example alkoxy groups or polyether groups, by chemically-bonding such groups to the silica surface. This may be done either by introducing both hydrophilic and hydrophobic groups into the one organosilicon compound or by reacting the silica with two compounds designed to attach both groups separately.

One preferred method of so treating the surface comprises chemical interaction of powdered silica with a substantially anhydrous monomeric silane having the formula $(R)_n$—Si—$(L)_{4-n}$ where $n=1$, 2 or 3, (R) is a hydrophobic group which is non-reactive to the silanol groups on the surface and (L) is a group which is reactive to the silanol groups on the silica surface.

The group L may include a lower alkoxy group, a chlorine or bromine atom or an acyl group. The lower alkoxy group is in general a group containing up to five carbon atoms and may be either a primary or a secondary alkoxy group or an alkyl ether substituted oxy group, e.g. $CH_3OCH_2CH_2O$. It is sometimes advantageous to have two or three different groups represented by L because normally secondary alkoxy groups are less reactive to the silanol group on the surface than are primary alkoxy groups and thus are more likely to remain intact and thus be able to impart a degree of hydrophilic character to the surface after the silane molecules with their hydrophobic group(s) R have become attached. The group L especially preferred is the ethoxy group and we have observed that a particularly suitable silane is a compound $$R—Si—(OC_2H_5)_3$$

where R is a group as hereinafter specified.

The group R may be a hydrocarbon group or a substituted hydrocarbon group the substitution being with an atom or group which is stable and inert to the silica for example chlorine, fluorine, trifluoromethyl, alkyl or aryl ether. The hydrocarbon group will in general be an alkyl or an alkenyl group containing from one to twenty carbon atoms, a phenyl, benzyl, tolyl, cyclopentyl or cyclohexyl group.

In the compounds when $n$ is not equal to unity the group R may be the same or different and one of these groups may include an alkyl ether link or the whole group may be a polyalkylene ether group. It is preferable when one group of $(R)_n$ is a fairly large group, i.e. one containing more than four carbon atoms that the other groups comprising $(R)_n$ be small groups, for example methyl or ethyl groups. Silanes containing only one group R (i.e. where $n=1$) are especially preferred, particularly when the other group is an alkoxy group, for example phenyl trichlorosilane, n-propyl trichlorosilane, methyl triethoxysilane, long chain alkyl triethoxy silane, of which the easiest to use is methyl triethoxysilane.

As an alternative to a compound as described above a silane having a hydrophilic substituent for either one R or one L group may be used. The hydrophilic substituent is most conveniently a non-ionic polyether chain, for example a polyethylene oxide chain.

Certain reactive silanes (for example dimethyldichlorosilane) are more difficult to use than others because too readily they produce a silica with a surface more hydrophobic than desired for this invention. The control of the reaction to provide just the desired balance between hydrophobic and hydrophilic character of the surface is more easily achieved with for example trimethylchlorosilane and this is therefore preferable to dimethyldichlorosilane in preparing the product of this invention. It is thought that the trimethylsilyl group being a bulky group will probably not allow too great a coverage of the surface with hydrophobic groups. Thus the nature and size of the groups present in the silane, together of course with the surface area of the silica, should be taken into account when deciding the concentration of silane to react with the silica.

In order to ensure that at least a substantial proportion of the silane does not polymerise before it reacts with the surface the silane is preferably kept substantially dry until it contacts the surface of the silica. After the surface has been treated with the silane, chemical reaction between the silane and the surface may be promoted by water and/or by heat.

Traces of water are almost always present at a siliceous surface and there may be sufficient water present in the silica to promote the reaction with the silane. Thus a silica of high surface area may contain up to 3% by weight of water (but it is desirably from 0.5–1.5%) as this concentration of water will conveniently promote the reaction of the monomeric silane with the silica particles. It may be necessary to reduce the moisture content of the silica, for example by drying for a period of about one hour at a temperature of 50° C.–70° C. The silane may then be added to the silica, intimately mixed and if the chemical reaction is slow it is convenient to heat the treated silica, optionally in a slow nitrogen stream, to a temperature of 40° C.–100° C., preferably 55° C.–70° C. The heating is preferably conducted under an atmosphere containing water, for example in a closed vessel, or in an oven through which controlled amounts of steam are passed. There is less need to heat the silica when reactive compounds such as $(CH_3)_3SiCl$ or $[(CH_3)_3Si]_2O$ are used.

The concentrations of silane or siloxane preferred for the treatment of high-area silica are at least 1%, for example from 1% to 30% by weight of silane added to the silica, but it is preferably 10% to 20% when an alkoxysilane is used and 5% to 15% when a chlorosilane is used. The increase in weight may be limited by the extent of coverage of the surface possible, steric factors probably being more important than the total concentration of silane present.

A treatment of a siliceous surface as described above imparts a degree of hydrophobic character to the surface but we believe it does not render it completely hydrophobic.

Silicon compounds other than silanes may be used to react with the silanol groups on the silica surface and produce the product of this invention. Symmetrical siloxanes and silazanes and particularly suitable perhaps because they have a tendency to split into two or more identical reactive groups (—$SiR_3$) containing one silicon atom and thus groups are attached to the silica in a similar way to the reaction with monomeric silanes of formula $R_3SiL$. For example the compounds hexamethyldisiloxane, hexamethyldisilazane, sym-divinyl-tetramethyldisiloxane may be conveniently used to produce silica of intermediate hydrophobicity.

Siloxane polymers are difficult to use to react with a silica to produce the desired degree of hydrophobicity for this invention. They react readily with silica but there is a strong tendency for the silica to become more hydrophobic than is desired in the present invention. However a polysiloxane containing hydrophilic groups as substituents on the silicon atoms may conveniently be used: the hydrophilic groups, which include for example oxyalkylene groups or hydroxy alkylene groups, will balance the hydrophobic character of the polysiloxane chain and a silica in accordane with this invention may be produced. Thus a suitable polysiloxane may have a general formula as follows:

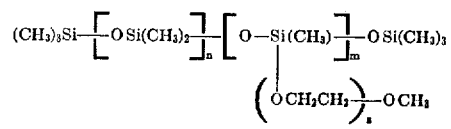

and by appropriate choice of the sizes of $n$, $m$ and $z$ a coating may be produced on a powdered silica of the desired hydrophobicity for the product of this invention.

Polysiloxanes are sometimes produced from a reaction between alkyl or aryl chlorosilanes in the presence of water. The silanes used are generally mixtures of mono, di and trichlorosilanes of general formula

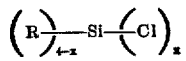

where R is an alkyl or aryl group and $x$ is 1, 2 or 3.

A variety of lengths of chain or degrees of branching may be produced by altering the relative proportions of mono, di and trichlorosilanes. It may be observed that if the proportion of the trichlorosilane is high considerable branching may be introduced and if there is an insufficient concentration of monochlorosilane to terminate all the branch ends with an $SiR_3$ group hydrophilic silanol groups will be produced at the ends of the branches by the hydrolysis of an Si—Cl group.

A mixture of chlorosilanes as described above may be used to treat powdered silica and if the proportion of trichlorosilane is high a partially hydrophobic silica according to this invention is produced. The proportions of the silanes may be for example:

|  | Percent |
|---|---|
| Mono—($R_3SiCl$) | 2 to 5 |
| Di—($R_2SiCl_2$) | 65 to 82 |
| Tri—($RSiCl_3$) | 15 to 30 |

They may be added as a vapour mixture to powdered silica and reaction will occur on the surface of the particles because generally sufficient water is present but further water may be added if necessary. A mixture of silanes as above wherein R is $CH_3$ is preferred.

In many other branches of technology where silica is used a partially hydrophobic silica is useful particularly in applications where aqueous and non-aqueous systems are involved. The peculiar character of its surface imparts to products properties hitherto not possessed by prior art samples of silica, but it should be stressed that the surface treatment requires to be performed carefully and with precision in order to obtain the product having the degree of hydrophobicity herein specified.

Hydrophobic silica is widely used as a flow additive for powders, an additive which prevents caking on storage and facilitates removal from the storage vessel and also facilitates the flow of the powder subsequently. The partially hydrophobic silica herein described is useful for this application in the concentration range 0.1% to 5%, preferably 0.5% to 2.5% because it minimises the tendency of the hydrophobic form to cause breakdown of a foam. Thus our silica may be advantageously used as a flow additive to fire-fighting powders to render them foam compatible, a property which it is very desirable that a fire-fighting powder possesses in order that the rapid flame extinguishing effect of the dry powder may be followed up with the application of a blanket of foam. Thus, a fire may be fought by applying to the fire a combination of an aqueous fire-fighting foam and a powdered composition comprising the above-identified alkaline fire-extinguishing powder and partially hydrophobic powdered silica.

Powders and particulate solids in general may be usefully treated with partially hydrophobic silica as a free-flow or anti-caking additive, and it is especially useful when added to a powdered solid required in use to come into contact with or function in an aqueous system. Thus this silica may be advantageously added to solid fertilisers and to detergent or pharmaceutical powders to provide a desirable balance between stable storage with the minimum absorption and the ability to be suspended or dissolved in water for use. This fom of silica is particularly advantageous in detergent powders which are required to produce a stable foam, for example a foamed gel as described in our copending U.S. Application No. 121,186.

Silica is used in thickening silicone oils to make greases and because the hydrophilic/hydrophobic character of the surface is important the treated silica of this invention provides an improvement over prior art silicas. It has been observed that the work stability (measured by a wetted cone penetrometer) of a silicone oil/grease is improved if from 5% to 30% of a partially hydrophobic silica as herein described is added to the composition. The preferred concentration is from 12% to 20% by weight.

The partially hydrophobic silica also provides improved emulsions with other oils and creams, for example cosmetic creams such as hand creams and face creams. Gel paints and thixotropic and emulsion paints may be improved by the incorporation of partially hydrophobic silica, a better blend of the solid being obtained with both hydrophobic or hydrophilic ingredients.

In many organic foam formulations a filler or thickener is desirable but it is clearly necessary for the additive to be one which will not cause any instability of the foam. Consequently foam formulations for making either synthetic rubber (for example polyurethane rubber) or natural rubber foams are improved by the use of a partially hydrophobic silica.

In silicone rubber technology silica is used as a filler but a silane or siloxane modified silica is preferable in that it may be more easily incorporated chemically into the rubber structure and therefore give an improved product. As an anti-blocking aid in plastic films, for example a packaging film, and as an additive for the improvement of the electrical resistivity of plasticised polymers, for example polyvinyl chloride, the silica of this invention will find application.

The invention is illustrated but in no way limited by the following Examples:

EXAMPLE 1

20 parts of triethoxymethylsilane were sprayed on to 100 parts of "Aerosil" silica of surface area 200 square metres per gram and containing 2% of water. The silane and silica were mixed thoroughly in a sealed cone-mixer at room temperature for two hours. Mixing was continued at a temperature of 60° C. for a further 24 hours following which the mixer was opened up to the atmosphere. The mixture was dried for six hours in the same apparatus by continuing the mixing operation for six hours with the vent open to allow the ethanol formed to escape.

EXAMPLE 2

30 parts of triethoxymethylsilane were sprayed over 100 parts of silica of surface area 200 square metres per gram and thoroughly mixed at room temperature. The mixture was spread in open trays which were placed in an oven maintained at 60° C. into which steam was passed to maintain a constant humidity. The reaction was allowed to continue for 12 hours. The supply of steam was then cut off and the mixture dried in the same oven for a further period of six hours.

EXAMPLE 3

A laboratory test for the foam compatibility was used to evaluate the treatments given to the silica.

1 g. of treated silica or 20 g. of a fire-fighting dry powder containing 1.5% silica are mixed with 30 mls. of petrol in a small beaker. The slurry is poured into a 2 litre measuring cylinder, 5 mls. of additional petrol are used to wash out the beaker. 25 mls. of petrol are poured into another 2 litre measuring cylinder as a blank. Both measuring cylinders are weighed. The two cylinders are both filled with protein foam from a foam extinguisher. (The foam should have an expansion ratio of between 7 and 8.) A stopwatch is started as the cylinders are filled. The two cylinders are reweighed and the half drainage time of both the sample and the blank measured. The values of $$100 \times \frac{\frac{1}{2} \text{ drainage time sample}}{\frac{1}{2} \text{ drainage time blank}}$$

may thus be calculated (percent F.C.)

The test was also applied to 20 g. of dry fire-fighting powder containing 1 g. of the silica as an additive. The results obtained by the foam compatibility test for differently-treated silicas and for 1.5% of the same treated silicas added to a fire-fighting powder made by the process described in Example 1 of our U.K. Pat. No. 1,168,092 are presented in Table 1.

TABLE 1

| Silane or silicone used to treat silica | Values of percent F.C. | |
|---|---|---|
| | Treated silica only | Fire-fighting powder containing 1.5% treated silica |
| Methyltriethoxysilane | 63 | 62 |
| Do | 70 | |
| n-Propyl trichlorosilane | 80 | |
| Tris β-chloroethoxymethyl | 68 | |
| Phenyl trichlorosilane | 76 | |
| Hexamethylsiloxane | 57 | |
| EP5904 ($C_{14}$ long-chain alkyltriethoxysilane) | 65 | 68 |
| Trimethylchlorosilane | 54 | 62 |

Samples of dry chemical powder which give results of greater than 50 for the percent F.C. values are normally satisfactory in the U.S. Underwriters test for fire-fighting chemicals.

Silica treated with methyltriethoxysilane (as in Table 1) was added to a sodium bicarbonate fire extinguishing powder and percent F.C. values of greater than 50 were obtained typically in the range 60 to 80.

EXAMPLE 4

An "Aerosil" silica ("Aerosil" 200) was treated, with a silicon compound as shown in Table 2 for a period of time ranging from 48–72 hours at room temperature followed by a heat treatment at a temperature within the range 50° C.–70° C. to complete the reaction. The resulting silica was given a methanol titration test for hydrophobicity and it was observed that according to the proportion of silicon compound used and the length of time reacted, the figures obtained for the degree of hydrophobicity fell into certain ranges as shown in Table 2.

TABLE 2

| Silicon compound: | Titration Test Degree of hydrophobicity (measured by the Methanol) |
|---|---|
| Methyl vinyldichlorosilane | 34–44 |
| Penhyl trichlorosilane | 15–25 |
| Trimethyl chlorosilane | 30–42 |
| Dimethyldiethoxysilane | 25–42 |
| n-Propyl trichlorosilane | 25–35 |
| Hexamethyldisiloxane | 20–30 |
| Diphenyldichlorosilane | 15–35 |
| Methyl triethoxysilane | 15–40 |
| $C_{14}$-alkyl triethoxysilane | 10–35 |

EXAMPLE 5

15 parts of triethoxymethylsilane were sprayed on to 100 parts of "Aerosil" silica contained in a heated ribbon mixer. The temperature of the silica during the spraying was 50° C.–55° C. The "Aerosil" had a specific surface of 200 square metres per gram and contained 1% moisture. Mixing was continued at 50° C.–55° C. for a period of 2 hours. The temperature was then increased to 65° C.–70° C. for 12 hours. During this period a slow stream of nitrogen was blown across the surface to remove by-product ethanol, and the flow of nitrogen was increased during a final two-hour drying period.

EXAMPLE 6

25 parts of triethoxymethylsilane were sprayed over 100 parts of silica ("Aerosil" surface area 200 square metres per gram). The silica and silane were thoroughly mixed in a triple cone mixer for 24 hours at ambient temperature, The treated silica was spread on to open trays 1½" in depth. These were placed in an oven maintained at 65° C. into which steam was passed so that the atmosphere was kept humid. The reaction was allowed to continue for 12 hours. The steam was then cut off and the silica dried in the same oven for a further 2 hours.

Analysis of the concentration of ethoxy groups on the silica gave values between 1.1 and 1.4 for the ratio of ethoxy:total carbon, the average value being 1.25. The value of 1.25 indicates that the mean molar ratio of ethoxy to methyl groups on the silica was 1:1.

What we claim is:

1. A fire-fighting foam compatible fire-fighting powder composition consisting essentially of an alkaline fire extinguishing powder and from 1% to 5% of a partially hydrophobic powdered silica having a surface area of at least 10 square metres per gram and carrying a surface treatment with a silane of the formula $(R)_n—Si—(L)_{4-n}$ where $n$ has the value of 1, 2 or 3 and R is a hydrophobic group which is non-reactive to the silanol groups on the silica surface and is a hydrocarbon group or a substituted hydrocarbon group, the hydrocarbon group being selected from alkyl and alkenyl of up to 20 carbon atoms, phenyl, benzyl, tolyl, cyclopentyl, cyclohexyl, and a polyoxyethylene, the substituent being selected from chlorine, fluorine, trifluoromethyl, or alkyl ether and L is a group which is reactive to the silanol groups on the silica surface and is a chlorine or an alkoxy group containing up to five carbon atoms, and possessing a degree of hydrophobicity measured by the methanol titration test in the range 5 to 35.

2. A method of imparting to an alkaline fire extinguishing powder compatability with aqueous foams consisting essentially of intimately mixing the powder with 0.1% to 5% of a partially hydrophobic powdered silica having a surface area of at least 10 square metres per gram and carrying a surface treatment with a silane of the formula $(R)_n—Si—(L)_{4-n}$ where $n$ has the value of 1, 2 or 3 and R is a hydrophobic group which is non-reactive to the silanol groups on the silica surface and is a hydrocarbon group or a substituted hydrocarbon group, the hydrocarbon group being selected from alkyl and alkenyl of up to 20 carbon atoms, phenyl, benzyl, tolyl, cyclopentyl, cyclohexyl, and a polyoxyethylene, the substituent being selected from chlorine, fluorine, trifluoromethyl, or alkyl ether and L is a group which is reactive to the silanol groups on the silica surface and is a chlorine or an alkoxy group containing up to five carbon atoms, and possessing a degree of hydrophobicity measured by the methanol titration test in the range 5 to 35.

3. A method as claimed in claim 2 wherein the concentration of partially hydrophobic silica is from 0.5% to 2.5%.

4. A method of fighting a fire comprising applying to the fire the combination of an aqueous fire-fighting foam and the powder composition as claimed in claim 1.

References Cited

UNITED STATES PATENTS

| 3,621,917 | 11/1971 | Rosen et al. | 252—3 X |
| 2,993,809 | 7/1961 | Bueche et al. | 117—100 |
| 3,677,347 | 7/1972 | Rosen | 252—3 X |
| 3,531,407 | 9/1970 | Phillips et al. | 252—2 |

OTHER REFERENCES

Kirk-Othner, Encyclopedia of Chemical Techonlogy 2nd ed., Vol. 18, p. 67, 1969.

MAYER WEINBLATT, Primary Examiner

U.S. Cl. X.R.

252—2, 3, 5, 7, 381, 383; 117—100

UNITED STATES PATENT OFFICE
CERTIFICATE OF CORRECTION

Patent No. 3,830,738     Dated August 20, 1974

Inventor(s) ARNOLD GEORGE COTTRELL

It is certified that error appears in the above-identified patent and that said Letters Patent are hereby corrected as shown below:

IN THE ABSTRACT OF THE DISCLOSURE:

Column 1, line 17, change "1%" to --0.1%--.

IN THE CLAIMS:

Claim 1, (column 8, line 15), change "1%" to --0.1%--;

(column 8, line 24), change "cyclopentyl," to --cyclopentyl and--;

(column 8, lines 24 and 25), delete "a polyoxyethylene,".

Claim 2, (column 8, line 44), change "cyclopentyl," to --cyclopentyl and--;

(column 8, line 44), delete "a polyoxyethylene,".

Signed and sealed this 1st day of July 1975.

(SEAL)
Attest:

RUTH C. MASON
Attesting Officer

C. MARSHALL DANN
Commissioner of Patents
and Trademarks